US012597158B2

(12) United States Patent
Chakravarty et al.

(10) Patent No.: US 12,597,158 B2
(45) Date of Patent: Apr. 7, 2026

(54) POSE ESTIMATION

(71) Applicant: Ford Global Technologies, LLC, Dearborn, MI (US)

(72) Inventors: Punarjay Chakravarty, Campbell, CA (US); Subodh Mishra, Bryan, TX (US); Mostafa Parchami, Ann Arbor, MI (US); Gaurav Pandey, College Station, TX (US); Shubham Shrivastava, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 734 days.

(21) Appl. No.: 17/676,432

(22) Filed: Feb. 21, 2022

(65) Prior Publication Data
US 2023/0267640 A1      Aug. 24, 2023

(51) Int. Cl.
| | |
|---|---|
| *G06T 7/73* | (2017.01) |
| *G06V 10/25* | (2022.01) |
| *G06V 10/82* | (2022.01) |
| *G06V 20/54* | (2022.01) |
| *G06V 20/58* | (2022.01) |

(52) U.S. Cl.
CPC ............... *G06T 7/73* (2017.01); *G06V 10/25* (2022.01); *G06V 10/82* (2022.01); *G06V 20/54* (2022.01); *G06V 20/58* (2022.01); *G06T 2207/20084* (2013.01); *G06T 2207/30236* (2013.01)

(58) Field of Classification Search
CPC ........................................................ G06T 7/73
See application file for complete search history.

(56) References Cited

U.S. PATENT DOCUMENTS

| | | | | |
|---|---|---|---|---|
| 2016/0364907 | A1* | 12/2016 | Schoenberg | ......... G02B 27/017 |
| 2017/0017848 | A1* | 1/2017 | Gupta | ................... B60W 30/06 |
| 2018/0350105 | A1* | 12/2018 | Taylor | ..................... G06T 7/162 |
| 2020/0349365 | A1 | 11/2020 | Behrendt | |
| 2021/0116914 | A1* | 4/2021 | Ren | ......................... G05D 1/024 |
| 2021/0264196 | A1 | 8/2021 | Abbeloos et al. | |
| 2022/0277472 | A1* | 9/2022 | Birchfield | ................. G06T 7/73 |

(Continued)

FOREIGN PATENT DOCUMENTS

| | | |
|---|---|---|
| JP | 2021056717 A | 4/2021 |

OTHER PUBLICATIONS

Arsalan Mousavian, Dragomir Anguelov, John Flynn, Jana Kosecka, 3D Bounding Box Estimation Using Deep Learning and Geometry, 2017 (Year: 2017).*

(Continued)

*Primary Examiner* — Kevin Ky
(74) *Attorney, Agent, or Firm* — Frank A. MacKenzie; Brooks Kushman P.C.

(57) ABSTRACT

A two-dimensional image segment that includes an outline of an object can be determined in a top-down fisheye image. A six degree of freedom (DoF) pose for the object can be determined based on determining a three-dimensional bounding box determined by one or more of (1) an axis of the two-dimensional image segment in a ground plane included in the top-down fisheye image and a three-dimensional model of the object and (2) inputting the two-dimensional image segment to a deep neural network trained to determine a three-dimensional bounding box for the object.

20 Claims, 9 Drawing Sheets

(56) References Cited

U.S. PATENT DOCUMENTS

2023/0032669 A1* 2/2023 Velankar ................... G06T 7/70
2023/0267640 A1* 8/2023 Chakravarty .......... G06V 20/54
                                                382/104

OTHER PUBLICATIONS

Geiger et al, Welcome to the KITTI Vision Benchmark Suite! (Year: 2012).*
Gaidon et al, Virtual KITTI Dataset (Year: 2016).*
Plaut, E. et al., "3D Object Detection from a Single Fisheye Image Without a Single Fisheye Training Image," arXiv:2003.03759v3 [cs.CV], May 31, 2021, 9 pages.

* cited by examiner

100

130

400

402

404

900

POSE ESTIMATION

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object tracking systems.

DETAILED DESCRIPTION

Figure 1:
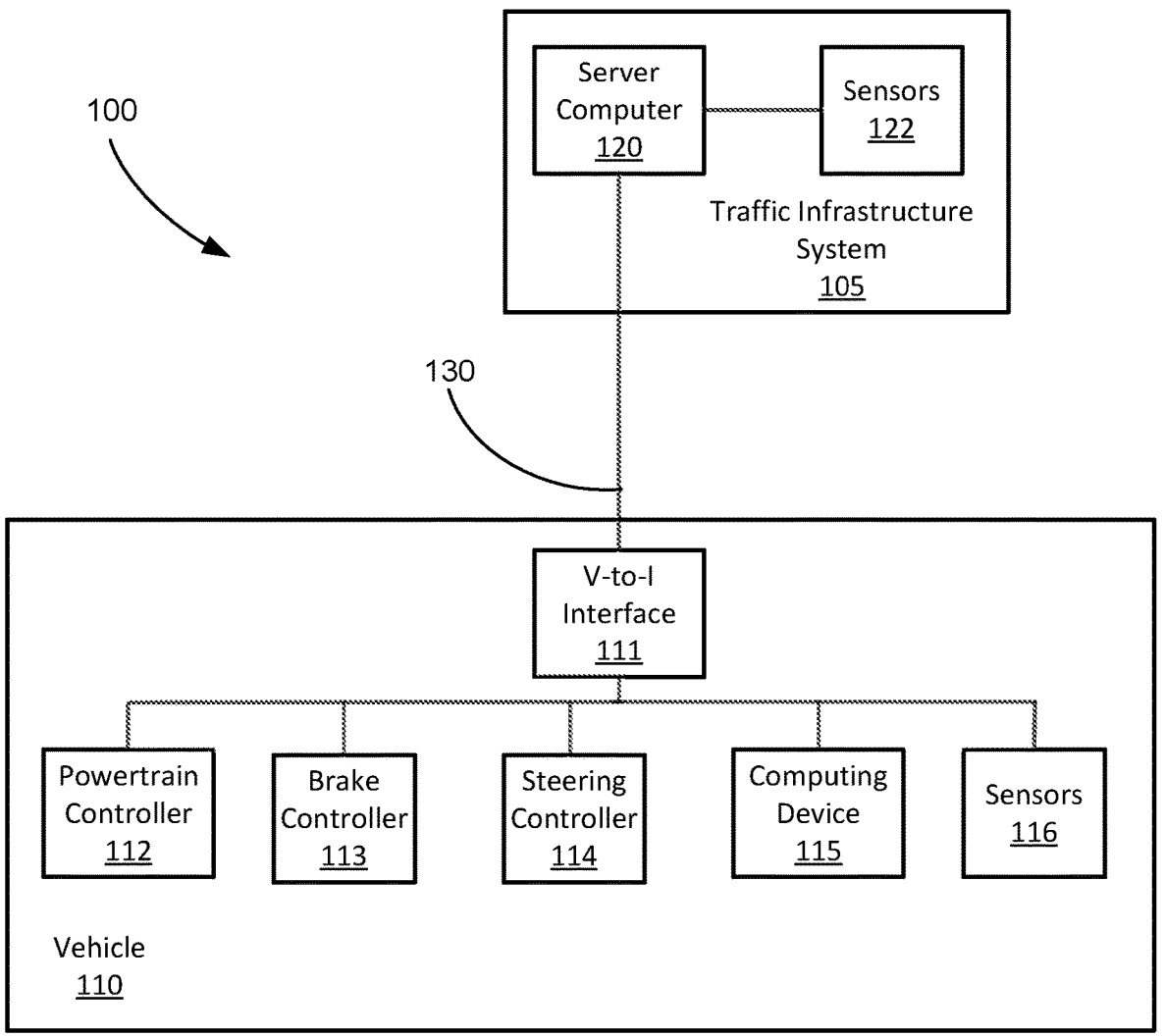
FIG. 1 is a block diagram of an example traffic infrastructure system.

A sensing system can acquire data, for example image data, regarding an environment around the system and process the data to determine identities and/or locations of objects. For example, a deep neural network (DNN) can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects, for example vehicles and pedestrians, in a traffic scene and determine a vehicle path for operating a vehicle based on the detected objects. A traffic scene is an environment around a traffic infrastructure system or a vehicle that can include a portion of a roadway and objects including vehicles and pedestrians, etc. For example, a computing device in a vehicle or traffic infrastructure system can be programmed to acquire one or more images from one or more sensors included in the vehicle or the traffic infrastructure system, detect objects in the images and communicate labels that identify the objects along with locations of the objects.

The sensors can include video or still image cameras that acquire images corresponding to visible or infrared wavelengths of light. The sensors can be included in the vehicle or can be stationary and can be mounted on poles, buildings, or other structures to give the sensors a view of the traffic scene including objects in the traffic scene. Sensors can also include lidar sensors, which typically emit infrared wavelengths of light, radar sensors which emit radio waves, and ultrasound sensors which emit sound waves. Lidar, radar, and ultrasound sensors all measure distances to points in the environment. In some examples sensors included in a vehicle can acquire one or more images of a traffic scene and process the images to determine locations of objects included in the images. The location of the objects can permit a computing device in the vehicle to determine a vehicle path upon which to operate the vehicle. Stationary sensors included in a traffic infrastructure system can provide data regarding objects in a traffic scene to augment data acquired by sensors included in the vehicle. In examples discussed herein, a fisheye camera included in a traffic infrastructure system can acquire data regarding objects included in a traffic scene and communicate the data to a vehicle.

Advantageously, techniques described herein can improve the ability of a computing device in a traffic infrastructure system to determine a six degree-of-freedom (DoF) pose of an object in an environment around the vehicle acquired using a camera that includes a fisheye lens. A fisheye lens is an extremely wide-angle lens that provides a panoramic or hemispherical field of view while introducing convex distortion that causes straight lines to appear curved. An advantage of a fisheye lens is that it permits a single camera to view an entire scene. A disadvantage of a fisheye lens is that additional processing can be required to extract quantitative data from image data acquired with a fisheye lens due to the convex distortion. A fisheye camera herein means a camera that includes a fisheye lens.

Disclosed herein is a method, including determining a two-dimensional image segment that includes an outline of an object in a top-down fisheye image and determining a six degree of freedom (DoF) pose for the object based on determining a three-dimensional bounding box determined by one or more of (1) an axis of the two-dimensional image segment in a ground plane included in the top-down fisheye image and a three-dimensional model of the object, and (2) inputting the two-dimensional image segment to a deep neural network trained to determine the three-dimensional bounding box for the object. The six DoF pose can be transmitted to a second computer included in a vehicle. The second computer can determine a vehicle path based on the six DoF pose of the object. The second computer can operate the vehicle on the vehicle path by controlling one or more of vehicle powertrain, vehicle steering, and vehicle brakes. The object can be a second vehicle.

The top-down fisheye image can be acquired by a camera including a fisheye lens included in a traffic infrastructure system. The two-dimensional image segment can be determined by a deep neural network. The axis of the two-dimensional image segment can be determined by determining a vehicle polygon. The ground plane can be based on a roadway included in the top-down fisheye image. The three-dimensional model of the object can be determined based on a size and a shape of the two-dimensional image segment. The three-dimensional bounding box can be determined based on projecting the three-dimensional model of the object onto a roadway plane. The roadway plane can be defined by a plane equation ax+by +cz=d and is coincident with a surface of a roadway. The vehicle polygon can be a rectangle. The three-dimensional bounding box can be determined based on projecting two rays which subtend the front and back edges of the vehicle polygon.

Further disclosed is a computer readable medium, storing program instructions for executing some or all of the above method steps. Further disclosed is a computer programmed for executing some or all of the above method steps, including a computer apparatus, programmed to determine a two-dimensional image segment that includes an outline of an object in a top-down fisheye image and determine a six degree of freedom (DoF) pose for the object based on determining a three-dimensional bounding box determined by one or more of (1) an axis of the two-dimensional image segment in a ground plane included in the top-down fisheye image and a three-dimensional model of the object, and (2) inputting the two-dimensional image segment to a deep neural network trained to determine the three-dimensional bounding box for the object. The six DoF pose can be transmitted to a second computer included in a vehicle. The second computer can determine a vehicle path based on the six DoF pose of the object. The second computer can operate the vehicle on the vehicle path by controlling one or more of vehicle powertrain, vehicle steering, and vehicle brakes. The object can be a second vehicle.

The instructions can include further instructions to acquire the top-down fisheye image by a camera including a fisheye lens included in a traffic infrastructure system. The two-dimensional image segment can be determined by a deep neural network. The axis of the two-dimensional image segment can be determined by determining a vehicle polygon. The ground plane can be based on a roadway included in the top-down fisheye image. The three-dimensional model of the object can be determined based on a size and a shape of the two-dimensional image segment. The three-dimensional bounding box can be determined based on projecting the three-dimensional model of the object onto a roadway plane. The roadway plane can be defined by a plane equation ax+by +cz=d and is coincident with a surface of a roadway. The vehicle polygon can be a rectangle. The three-dimensional bounding box can be determined based on projecting two rays which subtend the front and back edges of the vehicle polygon.

FIG. 1 is a diagram of a sensing system 100 that can include a traffic infrastructure system 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
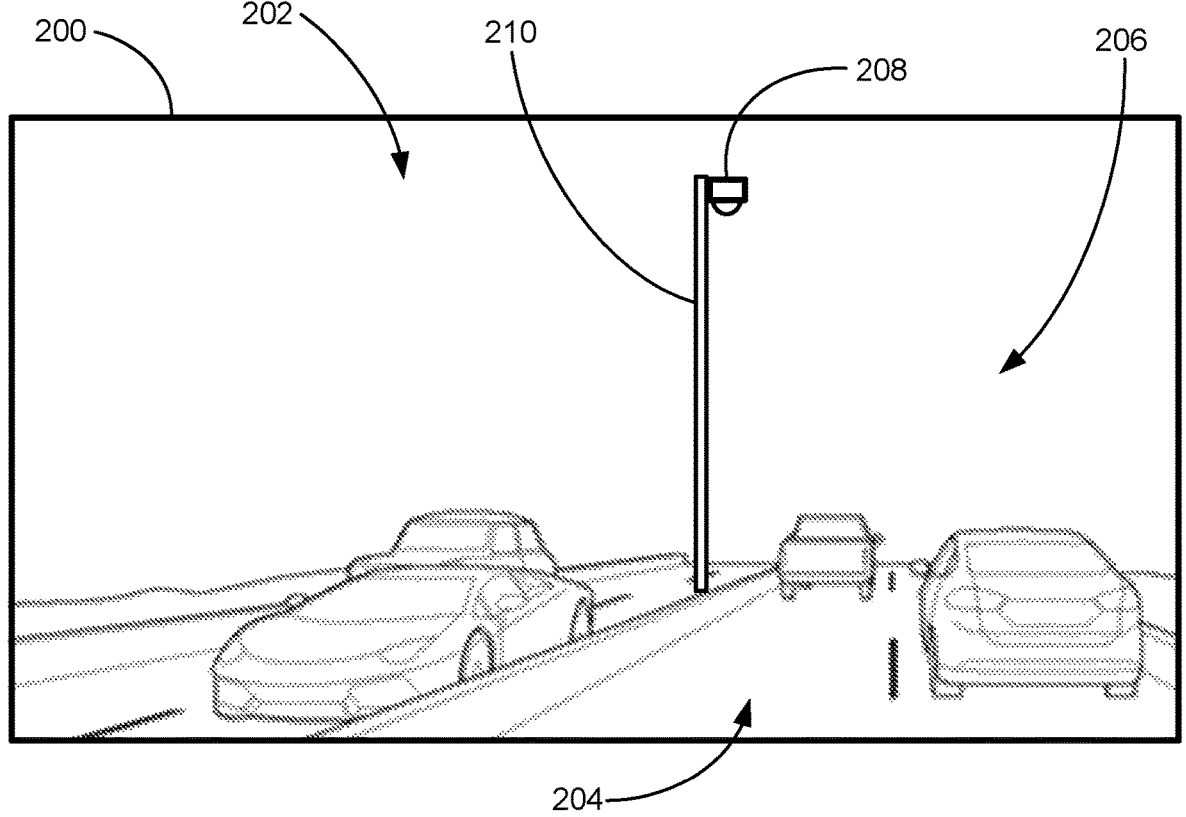
FIG. 2 is a diagram of an example image of a traffic scene including a fisheye camera.

FIG. 2 is a diagram of an image 200 of a traffic scene 202. Traffic scene 202 includes a roadway 204, and vehicles 206. The traffic scene 202 also includes a fisheye camera 208 which can be a stationary sensor 122 included in a traffic infrastructure system 105. The fisheye camera 208 can be mounted on a camera mount 210, which can include traffic signal poles, light poles, purpose-built poles or mounts, buildings, or existing structures such as bridges, overpasses, or sign poles. The fisheye camera 208 can be a video camera and acquire a plurality of frames of RGB color images, for example. The images acquired by a fisheye camera 208, or data extracted from an image acquired by a fisheye camera 208 can be communicated to a computing device 115 in a vehicle 110 by a server computer 120 included in a traffic infrastructure system 105.

Figure 3:
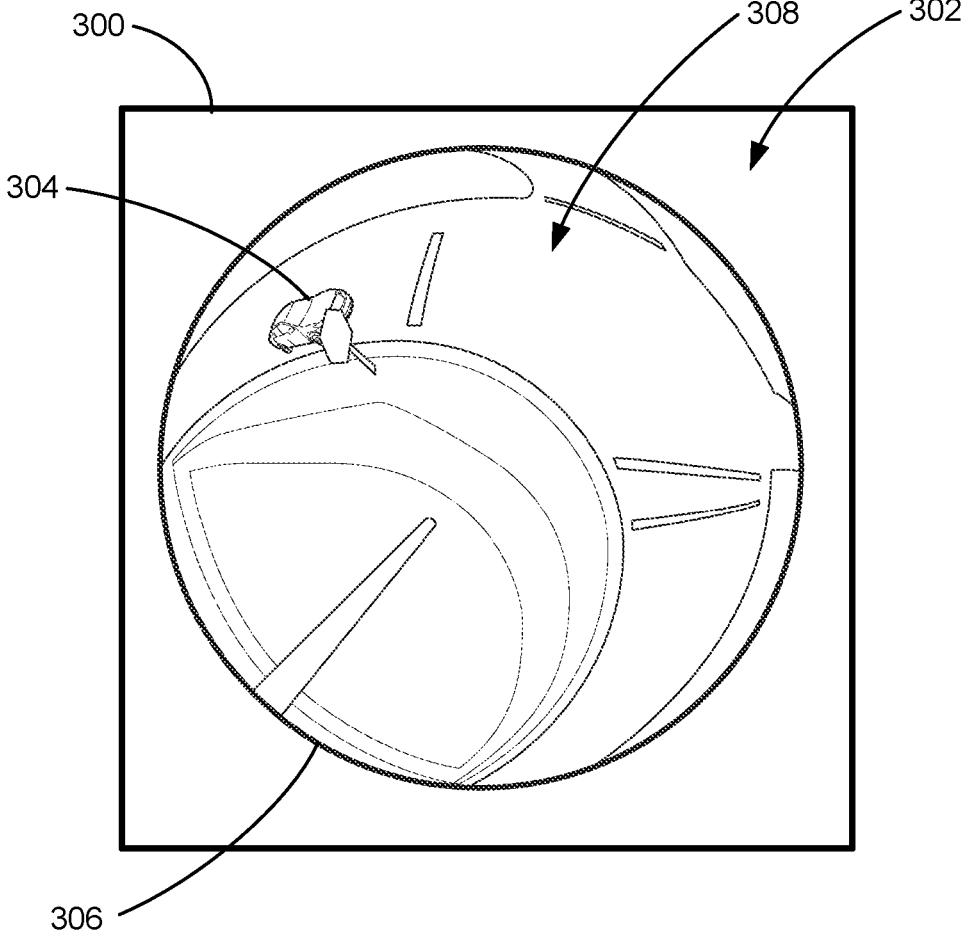
FIG. 3 is a diagram of an example image of a traffic scene acquired with a fisheye camera.

FIG. 3 is a diagram of a fisheye image 300 of a traffic scene 302 acquired by a fisheye camera 208. Fisheye image 300 includes a roadway 308, the mounting pole upon which the fisheye camera 208 is mounted and a vehicle 304. Fisheye image 300 provides a panoramic view of the traffic scene 302 beneath the fisheye camera 208, however, the convex distortion included in the fisheye image 300 can cause lines that are straight in the real world to appear curved in the fisheye image 300, for example edges of the roadway 308.

Acquiring an image with a fisheye camera 208 can be described mathematically as first projecting world coordinates, i.e., global coordinates included in a real-world traffic scene, into camera coordinates, i.e., coordinates measured relative to the camera sensor plane:

$$\begin{bmatrix} X_C \\ Y_C \\ Z_C \end{bmatrix} = {}^C R_W \begin{bmatrix} X_W \\ Y_W \\ Z_W \end{bmatrix} + {}^C t_W \tag{1}$$

In Equation 1, $X_W$, $Y_W$, $Z_W$ are the three axis coordinates of a point in real-world coordinates, $X_C$, $Y_C$, $Z_C$ are the three axis coordinates of a point in camera coordinates, ${}^C R_W$ is a 3×3 rotational matrix that rotates a point in three-dimensional space and ${}^C t_W$ is a 1×3 matrix that translates a point in three-dimensional space. Imaging a point in three-dimensional space with a fisheye lens can be modeled as projecting the point onto a unit sphere by the equation:

$$\begin{bmatrix} X_S \\ Y_S \\ Z_S \end{bmatrix} = \begin{bmatrix} \dfrac{X_C}{\sqrt{X_C^2 + Y_C^2 + Z_C^2}} \\ \dfrac{Y_C}{\sqrt{X_C^2 + Y_C^2 + Z_C^2}} \\ \dfrac{Z_C}{\sqrt{X_C^2 + Y_C^2 + Z_C^2}} \end{bmatrix} \tag{2}$$

In Equation 2, $X_s$, $Y_s$, $Z_s$ are the three axis coordinates of a point projected on to the unit sphere. The point on the unit sphere is then projected onto a normalized plane to yield normalized coordinates $x_{ud}$, $y_{ud}$ by the equation:

$$\begin{bmatrix} x_{ud} \\ y_{ud} \end{bmatrix} = \begin{bmatrix} \dfrac{X_S}{Z_S + \xi} \\ \dfrac{Y_S}{Z_S + \xi} \end{bmatrix} \tag{3}$$

Distortion parameters related to the fisheye lens distortion $k_1$, $k_2$, $p_1$, $p_2$, can be estimated by determining the intrinsic calibration of the fisheye lens. Intrinsic calibration includes the parameters that determine the fisheye lens distortion that occurs in addition to the distortion due to the spherical lens. The fisheye lens distortion parameters are applied to the normalized coordinates to transform the undistorted coordinates $x_{ud}$, $y_{ud}$ to distorted coordinates $$x_d, y_d : \begin{bmatrix} x_d \\ y_d \end{bmatrix} = \tag{4}$$

$$\begin{bmatrix} x_{ud}\left(1 + k_1\left(x^2 + y^2\right) + k_2\left(x^2 + y^2\right)^2\right) + 2p_1 x_{ud} y_{ud} + p_2\left(\left(x^2 + y^2\right) + 2x^2\right) \\ y_{ud}\left(1 + k_1\left(x^2 + y^2\right) + k_2\left(x^2 + y^2\right)^2\right) + 2p_2 x_{ud} y_{ud} + p_1\left(\left(x^2 + y^2\right) + 2x^2\right) \end{bmatrix}$$

A generalized camera projection matrix that converts the distorted, normalized fisheye coordinates into camera coordinates $$p = \begin{bmatrix} u \\ v \end{bmatrix}$$

using camera parameters for focal length $f_x$, $f_y$ in x and y, optical center $c_x$, $c_y$ in x and y and skew s:

$$p = \begin{bmatrix} u \\ v \end{bmatrix} = \begin{bmatrix} f_s & s & c_x \\ 0 & f_y & c_y \end{bmatrix} \begin{bmatrix} x_d \\ y_d \\ 1 \end{bmatrix} \tag{5}$$

Applying equations (1)-(5) to real world coordinates $X_W$, $Y_W$, $Z_W$ can yield camera coordinates p, i.e., applying equations (1)-(5) to a real world traffic scene 202 can yield a fisheye image 300. This is summarized by the equation:

$$F(p) = \Pi(\varnothing) \tag{6}$$

where F(p) is a fisheye image, H is the transform that includes equations (1)-(5) and 0 is a set of data points in three-dimensional real-world coordinates.

Figure 4:
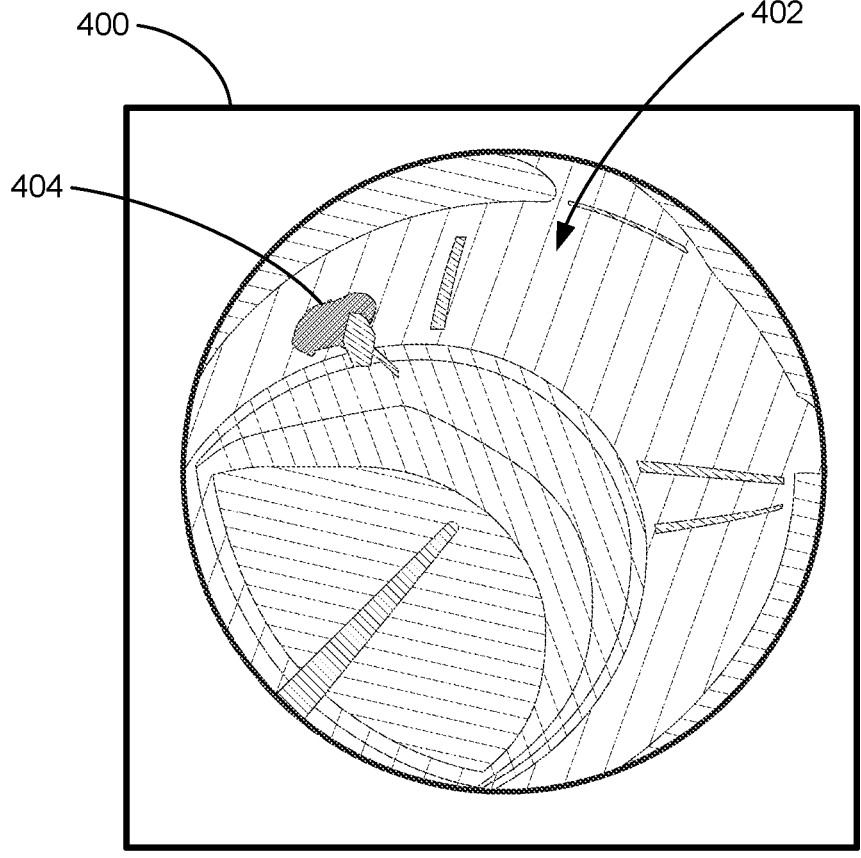
FIG. 4 is a diagram of an example segmented image of a traffic scene.

FIG. 4 is a diagram of a segmented fisheye image 400 that has been divided into segments by inputting fisheye image 300 to image segmentation software. An example of image segmentation software is Mask-RCNN. Mask-RCNN is a neural network-based segmentation algorithm available at the website viso.ai as of the filing date of this application. Image segmentation determines regions in an image within edges that include pixels with similar intensity or color. Edges in images can be determined by processing the image to determine large changes in pixel intensity or color values that typically indicate object boundaries. Pixels of each segment can be labeled with an integer value that can be used to separate the segment from the rest of the image. Once segments are determined in an image such as segmented fisheye image 400, the segments can be identified by location, size and shape. Segmented fisheye image 400 includes segments identified as roadway segment 402 and vehicle segment 404. For example, vehicle segment 404 can be identified because of its size, shape, and location on roadway segment 402.

Figure 5:
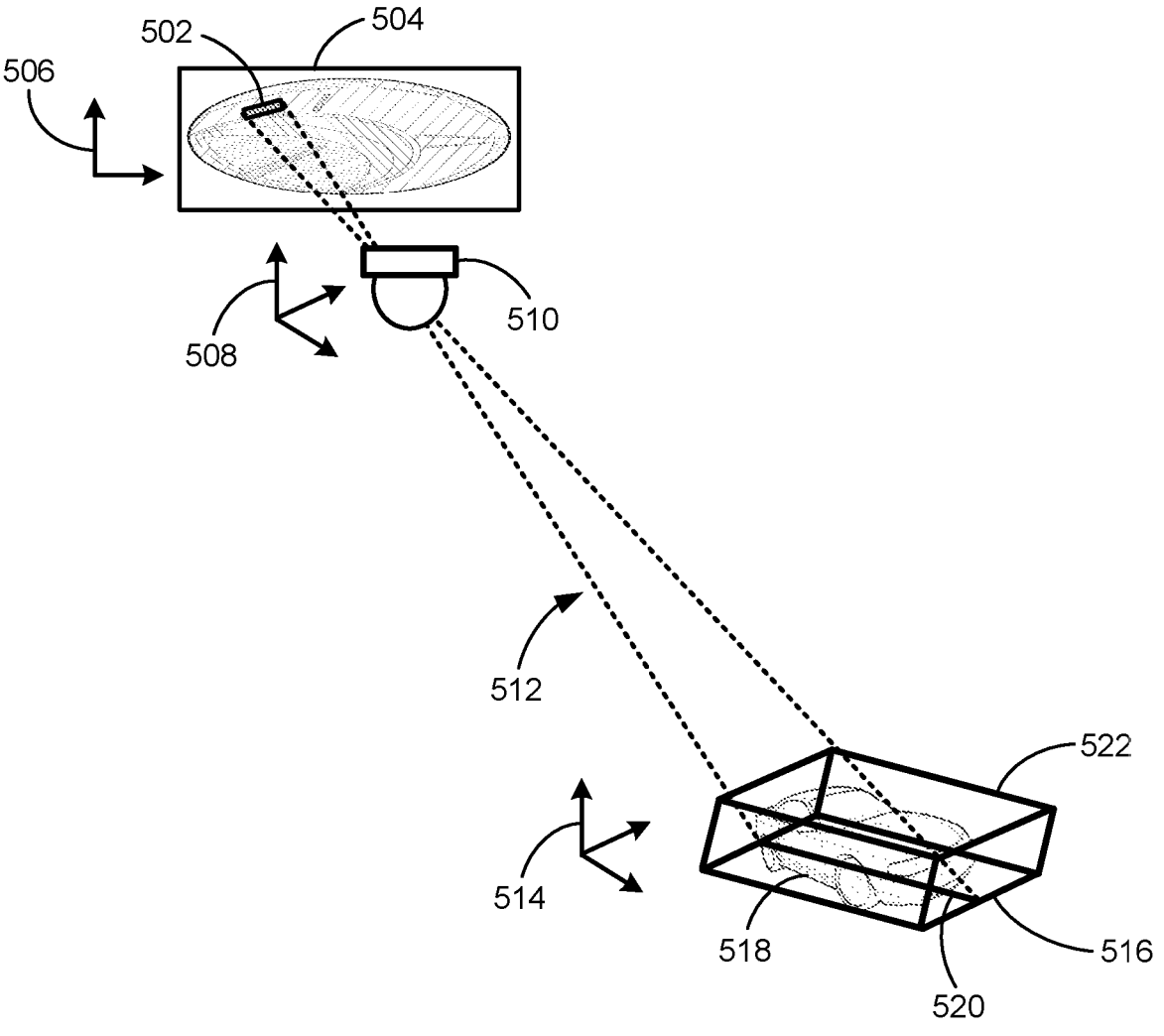
FIG. 5 is a diagram of example three-dimensional bounding box construction.

FIG. 5 is a diagram illustrating a geometric approach to determining a three-dimensional (3D) bounding box in global coordinates for an object such as a vehicle 502 included in a fisheye image 300. The image segment that includes vehicle 502 whose outline or edges form or are used to define a shape referred to herein as a polygon. The polygon can be rectangle, for example, where the polygon has two opposing long sides and two opposing short sides. A line which defines a principal axis of the vehicle 502 polygon can be transformed using data regarding the fisheye camera 508 intrinsic parameters, the geometry of the roadway plane 516 in global coordinates 514 and a vehicle model 518. A vehicle model 518 is a mathematical representation of the exterior surfaces of a vehicle. A vehicle model 518 can be a polygonal mesh based on 3D computer aided design (CAD) drawings, for example. The transformation that transforms image plane coordinates 506 into global coordinates 514 is based on reversing equations (1)-(5), above by inverting the matrix operations in equations (1)-(5). Two rays 512 (dotted lines) which subtend the front and back edges of the vehicle 502 polygon are projected through the fisheye camera 508 lens to intersect the roadway plane 516. The roadway plane 516 can be defined by a plane equation, i.e., ax+by +cz=d. The parameters a, b, c, and d are selected to make the roadway plane 516 coincident with the surface of the roadway 204. The roadway plane 516 is a can be determined in global coordinates with respect to the location of the fisheye camera 508 by measuring the roadway 204 with surveying equipment at the time the fisheye camera 508 is installed, for example.

Because vehicle 502 polygon typically will have two sides that are longer than the other two sides an ellipse that subtends the vehicle 502 polygon can be constructed and the intersections of a major axis of the ellipse with the polygon can be determined to locate the starting ends of the rays 512. A line 520 can be defined based on the intersection of the rays 512 with the roadway plane 516 that aligns an axis of the vehicle model 518 that defines a yaw angle with respect to the global coordinates 514. A 3D bounding box 522 can be constructed based on the size of the vehicle model 518 and the roadway plane 516 so that the center of the 3D bounding box 522 coincides with the center of the vehicle model 518.

Determining the 3D bounding box in this fashion provides the location of the center of the 3D bounding box 522, the yaw angle of the 3D bounding box 522, and the size of the 3D bounding box 522, all in global coordinates 514. Data regarding the location, yaw angle, and size of the 3D bounding box 522, specified in global coordinates 514, can be transferred from a server computer 120 in a traffic infrastructure system 105 to a computing device 115 in a vehicle 110 and used by the computing device 115 to operate the vehicle 110. The yaw angle determined on the roadway plane 516 can be 180 degrees off, i.e., the vehicle model 518 can be assumed to be pointing in the wrong direction.

Because the location, yaw angle, and size of the vehicle model 518 will be determined in a plurality of images over a series of time steps, the location of the vehicle model 518 can be tracked and the tracked motion of the vehicle model 518 can be used to determine the correct orientation of the vehicle model 518. The 3D bounding box 522 is determined in six degrees of freedom (DoF). Six DoF includes three positional coordinates in orthogonal x, y, and z axes and three rotational coordinates in roll, pitch, and yaw about the x, y, and z axes, respectively. The roll and pitch of the 3D bounding box 522 are assumed to be zero because the roadway plane 516 around the fisheye camera 510 is assumed to be flat. If the original measurement of the roadway plane 516 determines that the roadway is tilted with respect to the fisheye camera 510, the determined roll and pitch of the roadway plane 516 can be added to the six DoF pose of the 3D bounding box 522.

Figure 6:
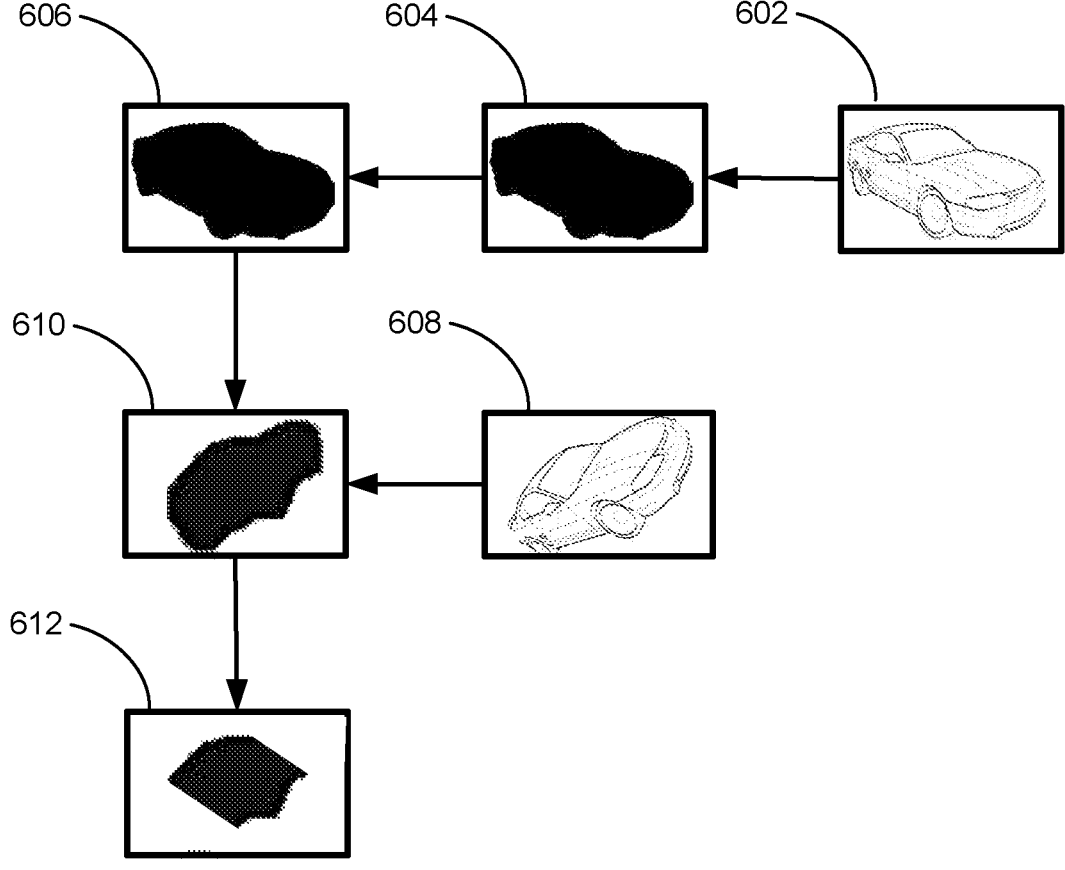
FIG. 6 is a diagram of example three-dimensional model matching.

FIG. 6 is a diagram of 3D vehicle model 602 matching used to improve the determination of vehicle six DoF pose. A 3D vehicle model 602 can be a mathematical representation of the exterior surfaces of a vehicle based on 3D CAD drawings as discussed above, for example. The dimensions of the 3D bounding box 522 can be initialized using the dimensions of the vehicle 502 polygon projected onto the roadway plane 516 and updated using a 2D image of the vehicle 502. However, if a 3D vehicle model 602 is available, the 3D vehicle model 602 can be used to determine the dimensions of a 3D bounding box 522. In addition, a 3D vehicle model 602 can be projected onto the fisheye camera 508 image plane coordinates 506 to further optimize the pose of the vehicle 502 relative to the camera.

A 3D vehicle model 602 can be parameterized using a signed distance function (SDF). An SDF is a function that represents objects in image data by parameterizing the pixels inside the object's boundary. The pixels are parameterized by giving them a value equal to their smallest distance to the object's boundary. Pixels further from the boundary increase in value until the center of the object is reached. Pixels inside the boundary are given positive values and pixels outside the boundary are given negative values. An SDF 3D vehicle model 602 is projected onto the fisheye camera 510 image plane coordinates 506 using the fisheye camera 510 intrinsic projection function discussed above in equations (1)-(5). Projecting the SDF version of the 3D vehicle model 602 onto the fisheye camera 510 image plane coordinates 506 yields model mask image 606. Separately, the vehicle 608 is converted to a segmented polygon the image using the Mask-RCNN segmentation algorithm, as discussed above, yielding the vehicle mask image 610. The residual image 612 is determined by applying an intersection over union (IoU) operator to determines a difference between the model mask image 606 and the vehicle mask image 610. An IoU operation divides the number of pixels in the intersection between model mask image 606 and vehicle mask image 610 by the number of pixels in the union between model mask image 606 and vehicle mask image 610. The residual image 612 can be used to optimize the match between 3D vehicle model 602 pose and vehicle 608 by iterating the process of generating a model mask image 606 while varying the pose of the 3D vehicle model 602 for each iteration until the residual image 612 is maximized. The 3D vehicle model 602 and vehicle 608 can be input to a standard non-linear Least Squares optimizer like Ceres, which iterates the Levenberg-Marquardt/Gauss-Newton algorithms to determine a maximum residual image 612.

Figure 7:
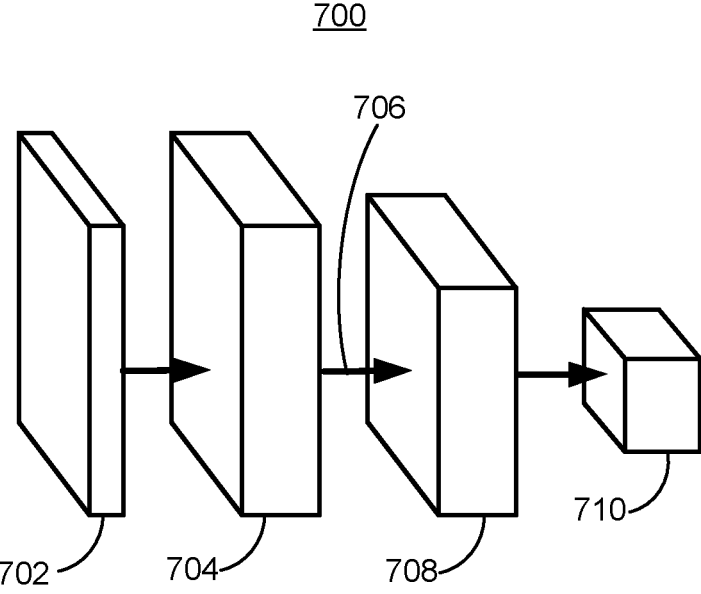
FIG. 7 is a diagram of an example convolutional neural network.

FIG. 7 is a block diagram of a convolutional neural network (CNN) 700. A CNN 700 can be used to determine a 3D bounding box 522 for vehicle 502 polygons in fisheye images 300. A geometric approach as discussed above in relation to FIG. 6 gives good results when the vehicle 502 polygon is not touching another object that obscures or alters the outline of the vehicle 502. A CNN 700 can be trained to determine a 3D bounding box 522 despite alterations or obscuring of vehicle 502 outlines. A technique that uses both a geometric approach and a CNN 700 can yield improved results by processing input images with vehicles 502 in a variety of input conditions including examples where the vehicle 502 is partially obscured or the outline is altered by neighboring vehicles.

CNN 700 inputs an image 702 and outputs one or more predictions 710 that include 3D bounding boxes 522 for vehicles 502 included in input image 702. A CNN 700 can include convolutional layers 704 which convolve the input image 702 using a plurality of convolutional kernels and output latent variables 706 to fully connected layers 708. Fully connected layers 708 process the latent variables 706 with a plurality of linear and/or non-linear algebraic functions to determine one or more predictions 710 corresponding to moving objects 322 included in input image 702.

CNN 700 can be trained using a training dataset that includes a plurality of input images 702 and user determined ground truth corresponding to the input images 702. Ground truth includes data regarding the real-world 3D bounding boxes 522 of vehicles 502 included in the training dataset. Training data can be generated using photo-realistic image rendering software to generate simulated images of vehicles in traffic scenes that realistically simulate a traffic scene 302 in the environment around a fisheye camera 208. An example photo-realistic rendering software is Unreal Engine produced by Epic Games, Cary, NC, 27518. Simulation software generate fisheye images 300 that simulate image acquisition by a real-world fisheye camera 208. Because the six DoF pose of the real-world fisheye camera 208 and the fisheye camera 208 parameters have been determined, the simulation software can use equations (1)-(5) to generate fisheye images 300 based on the simulated images that appear as if they were acquired from real-world traffic scenes. Because the photo-realistic rendering software uses as input the 3D location and a 3D model of the vehicle 502, ground truth regarding the 3D bounding box 522 to be output by the CNN 700 are readily available for all simulated images.

During training, parameters corresponding to the convolution kernels and algebraic functions can be randomly or pseudo-randomly selected and an input image 702 is processed to determine one or more 3D bounding box predictions 710. The 3D bounding box predictions 710 can be compared to the ground truth corresponding to the input image 702 and loss functions can be determined. The loss function is input to the convolutional layers 704 and fully connected layers 708 to select parameters for the convolution kernels and algebraic functions that result in the best correspondence between 3D bounding box predictions 710 and ground truth, thus training the CNN 700.

An advantage of using the vehicle segment 404 mask for training and operating a CNN 700 is that it is independent of the fidelity of the simulation. Fidelity of the simulation is the extent to which a simulated image matches an image acquired by a real-world camera of a real-world scene. Matching refers to comparing pixel values in the simulated image and the real-world image. Using simulation data for training a CNN 700 can be difficult because, while the visual appearance simulated images is getting more and more realistic over time, simulated images still typically do not match real-world image perfectly or undetectably to the human eye. A simulated image is typically slightly different than real image data. This means that a CNN 700 trained on simulated images does not always produce results as expected on the real-world images. This is referred to as the domain gap problem between simulated data and real-world data. Using vehicle segment 404 masks from simulated data and training the CNN 700 using vehicle segment 404 masks avoids the domain gap problem because vehicle segment 404 masks from real-world data and simulated data are identical. Once the CNN 700 is trained to generate 3D bounding boxes 522 using vehicle segment 404 masks from simulated data, the CNN 700 can generate 3D bounding boxes 522 based on vehicle segment 404 masks generated from real-world data with no domain gap problems.

Generating training datasets including ground truth can be a problem in training a CNN 700. Acquiring accurate 3D bounding box data for vehicles in real-world traffic scenes can require acquiring lidar data and processing the lidar data using computing resources. Annotating the acquired fisheye images can include employing expensive computer resources to acquire and process the data. Using simulated data addresses the need for acquiring and annotating large datasets. Using simulated data to generate training datasets improves training a CNN 700 by eliminating the need for human and computer resources to acquire and annotate the training dataset.

Both a geometric approach as discussed in relation to FIG. 5, and a CNN 700 based approach as discussed in relation to FIG. 7, have strengths and weaknesses in determining a 3D bounding box 522 based on a fisheye image 300. A geometric approach is very accurate and very efficient in using computer resources to determine 3D bounding boxes 522 from fisheye images 300 when a distinct outline for a vehicle 304 is visible in the fisheye image 300. A CNN 700 can require more computer resources to operate. However, the CNN 700 can determine accurate 3D bounding boxes 522 even when an incomplete or partially obscured vehicle 304 outline is visible in the fisheye image 300. Advantageously, techniques described herein use both a geometric approach and a CNN 700 approach to determine 3D bounding boxes 522, thereby addressing the afore-said weaknesses while gaining the afore-said strengths. For example, a vehicle segment 404 from a segmented fisheye image 400 can be input to image processing software to determine whether the vehicle segment 404 has size and shape parameters that would permit a geometric approach to determine an accurate 3D bounding box 522. When the size and shape parameters of vehicle segment 404 are outside of user-determined acceptable ranges, a CNN 700 can be used to determine the 3D bounding box 522. In this fashion, techniques described herein can minimize the use of computer resources while guaranteeing accurate results when determining global coordinates for a 3D bounding box 522 for a vehicle 304 in a fisheye image 300.

An example of image processing software that can determine size and shape parameters from a segmented image are the "contourArea" and "moments" routines from the OpenCV library discussed above. The contourArea routine finds measures the number of pixels within a segmented image portion. The moments routine determines parameters of a smallest enclosing rectangle or ellipse around a segmented image portion. Parameters returned from the contourArea and moments routines can be used to determine whether a vehicle segment 404 portion of a segmented fisheye image 400 should be processed using a geometric approach or a CNN 700 approach.

Figure 8:
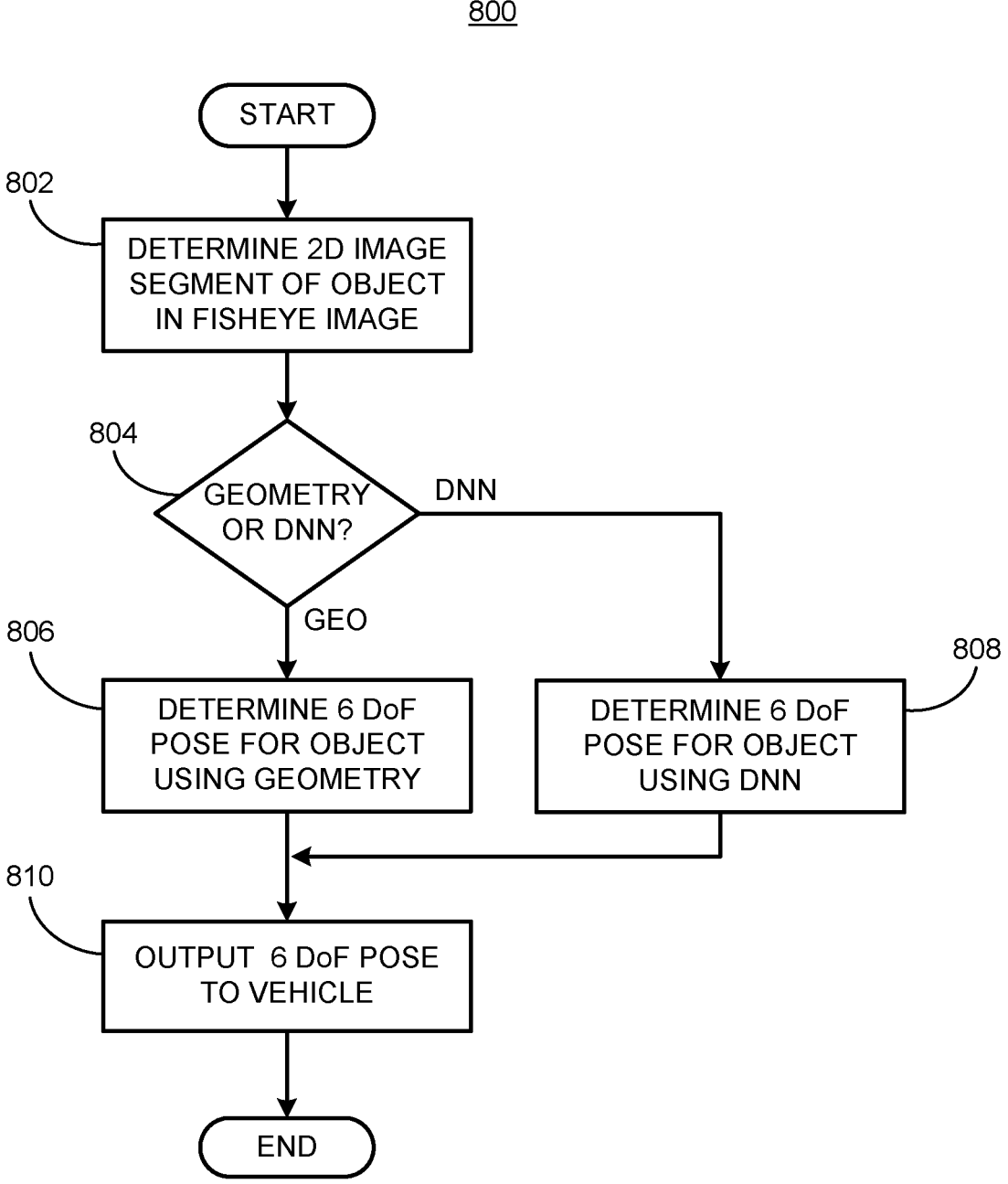
FIG. 8 is a flowchart diagram of an example process to determine a six degree-of-freedom pose for an object in a fisheye image.

FIG. 8 is a flowchart, described in relation to FIGS. 1-7, of a process 800 for determining a 3D bounding box 522 for a vehicle 304 included in a fisheye image 300. Process 800 can be implemented by a processor of a computing device 115 or server computer 120, taking as input image data from sensors 116, 122, executing commands, and outputting a 3D bounding box 522 for a vehicle 304 included in a fisheye image 300. Process 800 includes multiple blocks that can be executed in the illustrated order. Process 800 could alternatively or additionally include fewer blocks or can include the blocks executed in different orders.

Process 800 begins at block 802, where a server computer 120 acquires a fisheye image 300 including a vehicle 304. The fisheye image is processed by image processing software as described above in relation to FIG. 4 to determine a vehicle segment 404.

At block 804 server computer 120 processes the vehicle segment 404 to determine whether a geometric approach or a CNN 700 approach should be used to determine a six DoF pose for a 3D bounding box 522 determined based on the vehicle segment 404 by processing the vehicle segment 404 with image processing software as discussed above in relation to FIG. 7. When the parameters output from the image processing software are within the value ranges that are consistent with the geometric approach, process 800 passes to block 806. When the parameters output from the image processing software are outside the ranges that are consistent with the geometric approach, process 800 passes to block 808.

At block 806 server computer 120 determines a six DoF pose for a 3D bounding box 522 based on the vehicle segment 404 using a geometric approach as discussed above in relation to FIGS. 5 and 6.

At block 808 server computer 120 determines a six DoF pose for a 3D bounding box 522 based on the vehicle segment 404 using a CNN 700 approach as discussed above in relation to FIG. 7.

At block 810 server computer 120 outputs a six DoF pose for a 3D bounding box 522 based on the vehicle segment 404 to a computing device 115 in a vehicle 110. Following block 810 process 800 ends.

Figure 9:
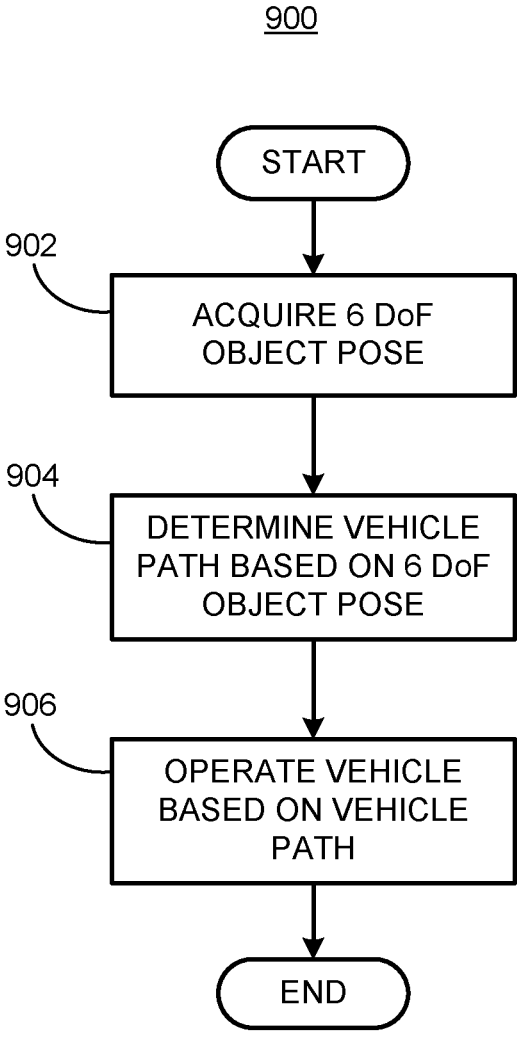
FIG. 9 is a flowchart diagram of an example process to operate a vehicle based on a six degree-of-freedom object pose.

FIG. 9 is a diagram of a flowchart, described in relation to FIGS. 1-8, of a process for operating a vehicle 110 based on a six DoF pose for a 3D bounding box 522 based on the vehicle segment 404. Process 900 can be implemented by a processor of a computing device 115, taking as input data from server computer 120 and sensors 116, executing commands, and operating vehicle 110. Process 900 includes multiple blocks that can be executed in the illustrated order. Process 900 could alternatively or additionally include fewer blocks or can include the blocks executed in different orders.

Process 900 begins at block 902, where a computing device 115 in a vehicle 110 downloads a six DoF pose for a 3D bounding box 522 based on a vehicle segment 404 included in a fisheye image 300 acquired by a fisheye camera 208 included in a traffic infrastructure system 105, for example.

At block 904 computing device 115 determines a vehicle path based on the six DoF pose for a 3D bounding box 522.

A vehicle path is a polynomial function that includes maximum and minimum lateral and longitudinal accelerations to be applied to vehicle motion as it travels along the vehicle path. Because 3D bounding box 522 is supplied to computing device 115, computing device 115 does not have to determine location and size data regarding vehicle 304 in the environment around vehicle 110, thereby reducing the computing resources required to operate vehicle 110.

At block 906 computing device 115 outputs commands to controllers 112, 113, 114 to control vehicle powertrain, vehicle steering, and vehicle brakes to control vehicle motion to operate vehicle 110 along the vehicle path determined at block 904. Following block 906 process 900 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a first computer that includes a processor; and a memory, the memory including instructions executable by the processor to:

determine a two-dimensional image segment that includes an outline of an object in a top-down fisheye image;

determine a six degree of freedom (DoF) pose for the two-dimensional image segment that includes the outline of the object based on determining a three-dimensional bounding box determined by an axis of the two-dimensional image segment in a ground plane included in the top-down fisheye image and a three-dimensional model of the object based on a signed distance function including transforming the two-dimensional image segment that includes the outline of the object from image plane coordinates to global coordinates based on fisheye lens distortion parameters; and output the six DoF pose to a second computer included in a vehicle to operate the vehicle.

2. The second computer of claim 1, wherein instructions in the second computer include instructions to determine a vehicle path based on the six DoF pose of the object.

3. The second computer of claim 2, wherein instructions in the second computer include instructions to operate the vehicle on the vehicle path by controlling one or more of vehicle powertrain, vehicle steering, and vehicle brakes.

4. The system of claim 1, wherein the object is a second vehicle.

5. The system of claim 1, wherein the top-down fisheye image is acquired by a camera including a fisheye lens included in a traffic infrastructure system.

6. The system of claim 1, wherein the two-dimensional image segment is determined by a deep neural network.

7. The system of claim 1, wherein the axis of the two-dimensional image segment is determined by vehicle polygon.

8. The system of claim 1, wherein the ground plane is based on a roadway included in the top-down fisheye image.

9. The system of claim 1, wherein the three-dimensional model of the object is determined based on a size and a shape of the two-dimensional image segment.

10. The system of claim 1, wherein the three-dimensional bounding box is determined based on projecting the three-dimensional model of the object onto a roadway plane.

11. The system of claim 1, the instructions including further instructions to determine a six degree of freedom (DoF) pose for the two-dimensional image segment that includes the outline of the object based on determining a three-dimensional bounding box determined by (1) an axis of the two-dimensional image segment in a ground plane included in the top-down fisheye image and a three-dimensional model of the object based on a signed distance function including transforming the two-dimensional image segment that includes the outline of the object from image plane coordinates to global coordinates based on fisheye lens distortion parameters, and (2) inputting the two-dimensional image segment to a deep neural network trained based on an object segment map and simulated images of objects to determine the three-dimensional bounding box for the object.

12. The system of claim 1, the instructions including instructions to determine a six degree of freedom (DoF) pose for the two-dimensional image segment that includes the outline of the object based on determining a three-dimensional bounding box determined by an axis of the two-dimensional image segment in a ground plane included in the top-down fisheye image and a three-dimensional model of the object based on a signed distance function including transforming the two-dimensional image segment that includes the outline of the object from image plane coordinates to global coordinates based on fisheye lens distortion parameters.

13. A method, comprising:
   determining a two-dimensional image segment that includes an outline of an object in a top-down fisheye image; and
   determining a six degree of freedom (DoF) pose for the two-dimensional image segment that includes the outline of the object based on determining a three-dimensional bounding box determined by an axis of the two-dimensional image segment in a ground plane included in the top-down fisheye image and a three-dimensional model of the object based on a signed distance function including transforming the two-dimensional image segment that includes the outline of the object from image plane coordinates to global coordinates based on fisheye lens distortion parameters; and
   transmitting the six DoF pose to a second computer included in a vehicle to operate the vehicle.

14. The method of claim 13, wherein the second computer determines a vehicle path based on the six DoF pose of the object.

15. The method of claim 14, wherein the second computer operates the vehicle on the vehicle path by controlling one or more of vehicle powertrain, vehicle steering, and vehicle brakes.

16. The method of claim 13, wherein the object is a second vehicle.

17. The method of claim 13, wherein the top-down fisheye image is acquired by a camera including a fisheye lens included in a traffic infrastructure system.

18. The method of claim 13, wherein the two-dimensional image segment is determined by a deep neural network.

19. The method of claim 13, wherein the axis of the two-dimensional image segment is determined by determining a vehicle polygon.

20. The method of claim 13, wherein the ground plane is based on a roadway included in the top-down fisheye image.

* * * * *